United States Patent
Tajima et al.

(10) Patent No.: US 10,296,942 B2
(45) Date of Patent: May 21, 2019

(54) ADVERTISEMENT CHOOSING DEVICE AND ADVERTISEMENT CHOOSING METHOD

(71) Applicant: YAHOO JAPAN CORPORATION, Tokyo (JP)

(72) Inventors: Akira Tajima, Tokyo (JP); Koji Tsukamoto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 836 days.

(21) Appl. No.: 14/036,732

(22) Filed: Sep. 25, 2013

(65) Prior Publication Data
US 2014/0089080 A1 Mar. 27, 2014

(30) Foreign Application Priority Data
Sep. 25, 2012 (JP) .................................. 2012-210387

(51) Int. Cl.
*G06Q 30/00* (2012.01)
*G06Q 30/02* (2012.01)

(52) U.S. Cl.
CPC ..... *G06Q 30/0251* (2013.01); *G06Q 30/0244* (2013.01)

(58) Field of Classification Search
CPC .................................. G06Q 30/0207–30/0277
USPC ............................................. 705/14.1–14.73
See application file for complete search history.

(56) References Cited

U.S. PATENT DOCUMENTS

| | | | | |
|---|---|---|---|---|
| 2003/0023485 | A1* | 1/2003 | Newsome ............... | G06Q 30/02 705/14.66 |
| 2004/0044571 | A1* | 3/2004 | Bronnimann .......... | G06Q 30/02 705/14.71 |
| 2010/0076841 | A1* | 3/2010 | Rajpure ................. | G06Q 30/03 705/14.49 |
| 2010/0198685 | A1* | 8/2010 | Bayati .................... | G06Q 30/02 705/14.52 |
| 2011/0016005 | A1* | 1/2011 | Li ..................... | G06F 17/30867 705/14.73 |

(Continued)

FOREIGN PATENT DOCUMENTS

| | | |
|---|---|---|
| JP | H09-231206 A | 9/1997 |
| JP | 2001-134581 A | 5/2001 |

(Continued)

OTHER PUBLICATIONS

Nov. 17, 2015 Japanese Office Action issued in Japanese Patent Application No. 2015-143506.

(Continued)

*Primary Examiner* — Matthew T Sittner
*Assistant Examiner* — Allan J Woodworth, II
(74) *Attorney, Agent, or Firm* — Oliff PLC

(57) ABSTRACT

An advertisement choosing device chooses an advertisement to be displayed in a display space of a predetermined size. The advertisement choosing device includes an advertisement storing unit and an advertisement choosing unit. The advertisement storing unit stores therein sizes of multiple advertisements of various sizes. The advertisement choosing unit chooses, from among the multiple advertisements, one or more advertisements whose total size is equal to or less than the size of the display space as the advertisement to be displayed in the display space.

11 Claims, 7 Drawing Sheets

(56) References Cited

U.S. PATENT DOCUMENTS

| | | | |
|---|---|---|---|
| 2011/0047026 A1* | 2/2011 | Biggs | G06Q 30/02 705/14.46 |
| 2011/0066487 A1* | 3/2011 | Charania | G06Q 10/00 705/14.43 |
| 2011/0106630 A1* | 5/2011 | Hegeman | G06Q 30/02 705/14.71 |
| 2012/0084809 A1* | 4/2012 | Schultz | G06Q 30/00 725/34 |
| 2012/0316934 A1* | 12/2012 | Zier | G06Q 30/02 705/14.4 |
| 2013/0097029 A1* | 4/2013 | Mhatre | G06Q 50/10 705/14.72 |
| 2013/0124342 A1* | 5/2013 | Virkar | G06Q 30/0241 705/14.73 |

FOREIGN PATENT DOCUMENTS

| | | |
|---|---|---|
| JP | 2003-122739 A | 4/2003 |
| JP | 2003-323083 A | 11/2003 |
| JP | 2005-044248 A | 2/2005 |
| JP | 2006-099775 A | 4/2006 |
| JP | A-2009-53219 | 3/2009 |
| JP | 2010-183186 A | 8/2010 |
| JP | 5000010 B1 | 8/2012 |
| JP | 2014066776 A | 4/2014 |
| JP | 2015-501478 A | 1/2015 |
| WO | 2013/055941 A1 | 4/2013 |

OTHER PUBLICATIONS

Aug. 5, 2014 Office Action issued in Japanese Patent Application No. 2012-210387.

Apr. 7, 2015 Office Action issued in Japanese Patent Application No. 2012-210387.

Mar. 29, 2016 Office Action issued in Japanese Patent Application No. 2015-143506.

Mar. 29, 2016 Office Action issued in Japanese Patent Application No. 2016-006687.

Dec. 6, 2016 Office Action issued in Japanese Patent Application No. 2015-143507.

Aug. 22, 2017 Office Action issued in Japanese Patent Application No. 2015-143507.

Apr. 3, 2018 Office Action issued in Japanese Patent Application No. 2015-143507.

* cited by examiner

| ADVERTISE-MENT ID | URL | TITLE/DESCRIPTION | SIZE | BID AMOUNT | CTR |
|---|---|---|---|---|---|
| A0001 | http://www.xxx.com/... | WE HAVE XXX COMPETITION ... | 1 | 10 | 0.000228 |
| A0002 | http://www.xxxxx.com/... | NICE AIR TRIP USING XXX ... | 2 | 14 | 0.000493 |
| A0003 | http://www.xxxxx.com/... | XX TRIP USING YYY <IMG SRC="..."> SPECIAL PROMOTION ... | 5 | 12 | 0.000089 |
| ⋮ | ⋮ | ⋮ | ⋮ | ⋮ | ⋮ |

| DISTRIBUTION DATE AND TIME | URL | ADVERTISEMENT ID |
|---|---|---|
| 2011/09/06 12:45:31 | /news/topnews?id=xxxxx | A0001 |
| 2011/09/06 12:45:31 | /news/topnews?id=xxxxx | A0003 |
| ⋮ | ⋮ | ⋮ |

| ADVERTISEMENT ID | URL | CLICK DATE AND TIME |
|---|---|---|
| A0001 | /news/topnews?id=xxxxx | 2011/09/06 12:45:31 |
| A0056 | /sports/baseball?id=xxx | 2011/09/06 12:46:01 |
| ⋮ | ⋮ | ⋮ |

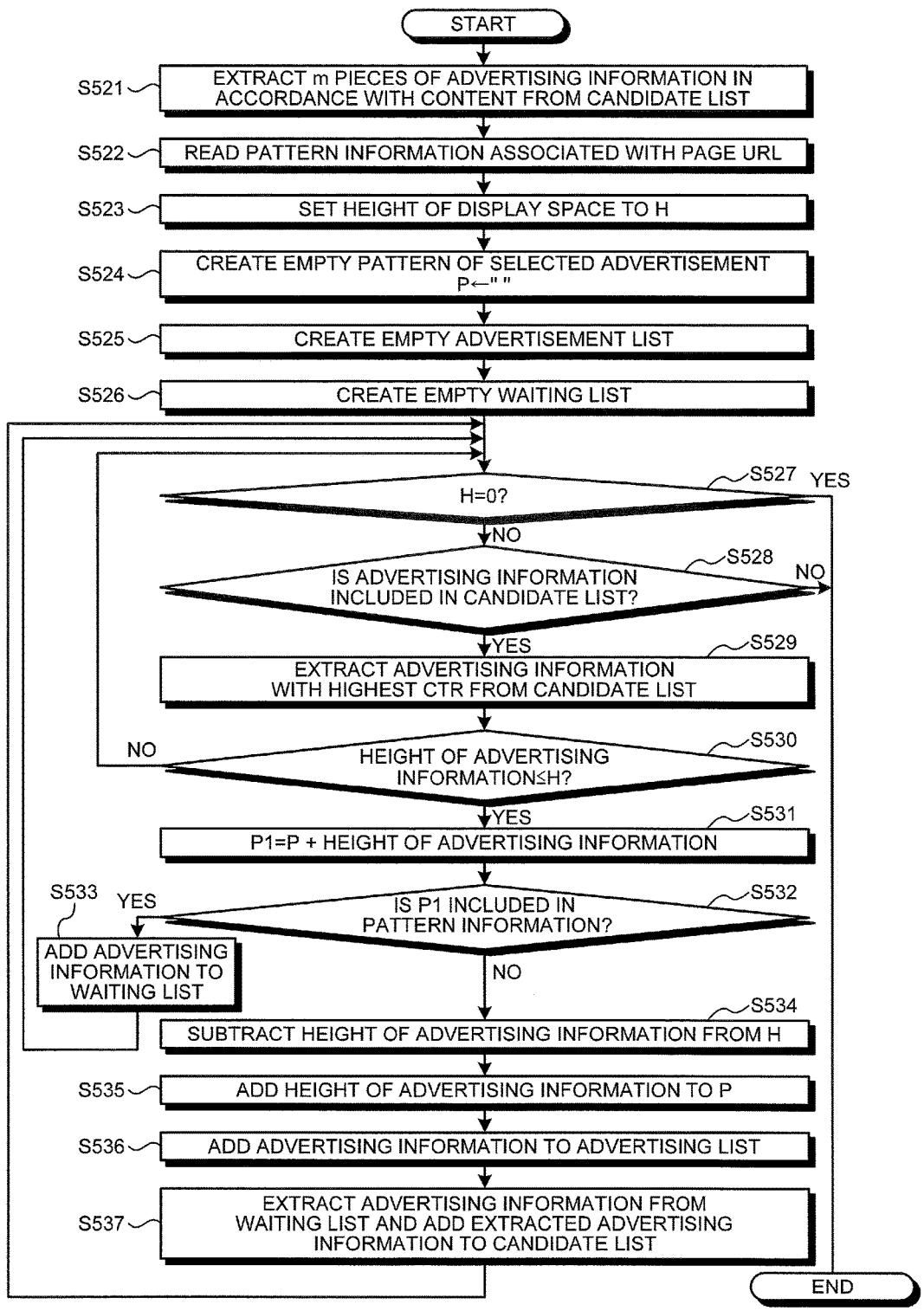

ADVERTISEMENT CHOOSING DEVICE AND ADVERTISEMENT CHOOSING METHOD

CROSS-REFERENCE TO RELATED APPLICATION

The present application claims priority to and incorporates by reference the entire contents of Japanese Patent Application No. 2012-210387 filed in Japan on Sep. 25, 2012.

FIELD

The embodiment discussed herein is directed to an advertisement choosing device, and an advertisement choosing method.

BACKGROUND

Content matching advertising, in which advertisements are displayed in accordance with content of Web pages, or keyword targeted advertising, in which advertisements are displayed in accordance with search keywords in search engines, are some examples of widely used ways of displaying advertisements on Web pages. Advertisement are created in a predetermined size and then displayed in display spaces on Web pages. Japanese Laid-open Patent Publication No. 2009-53219 discloses a technology that displays banner advertisements in a smaller space by dividing a display space into more than one areas and displaying reduced-size versions of advertisements in these areas.

In reality, the design of advertisements varies and the size of the advertisements can be freely determined by designers. However, the conventional technology, such as the system disclosed in Japanese Laid-open Patent Publication No. 2009-53219, is based on the assumption that advertisements are submitted in the same size, and thus is not able to handle advertisements in different sizes.

SUMMARY

It is an object of the present invention to at least partially solve the problems in the conventional technology.

According to one aspect of an embodiment, an advertisement choosing device chooses an advertisement to be displayed in a display space of a predetermined size. The advertisement choosing device includes: an advertisement storing unit that stores therein sizes of multiple advertisements of various sizes; and an advertisement choosing unit that chooses, from among the multiple advertisements, one or more advertisements whose total size is equal to or less than the size of the display space as the advertisement to be displayed in the display space.

According to another aspect of an embodiment, an advertisement choosing device chooses an advertisement of a video image that is to be displayed in a display space. The advertisement choosing device includes: a maximum value storing unit that stores therein a maximum value of a playback time of the video image that can be displayed in the display space; an advertisement storing unit that stores therein the playback time of each of multiple advertisements; and an advertisement choosing unit that chooses, from among the multiple advertisements, one or more advertisements whose total playback time is equal to or less than the maximum value as an advertisement to be displayed in the display space.

According to still another aspect of an embodiment, an advertisement choosing method for choosing an advertisement to be displayed in a display space of a predetermined size, the advertisement choosing method includes: storing sizes of multiple advertisements of various sizes; and choosing, from among the multiple advertisements, one or more advertisements whose total size is equal to or less than the size of the display space as the advertisement to be displayed in the display space.

According to still another aspect of an embodiment, a computer-readable recording medium having stored therein a program for choosing an advertisement to be displayed in a display space of a predetermined size, the program causing a computer to execute a process including: storing sizes of multiple advertisements of various sizes; and choosing, from among the multiple advertisements, one or more advertisements whose total size is equal to or less than the size of the display space as the advertisement to be displayed in the display space.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 5 is a schematic diagram illustrating an example configuration of advertising information stored in an advertisement database;

FIG. 6 is a schematic diagram illustrating an example configuration of an impression log stored in an impression log storing unit;

FIG. 7 is a schematic diagram illustrating an example configuration of a click log stored in a click log storing unit;

FIG. 10 is a flowchart illustrating the flow of a process for choosing an advertisement to be displayed on a display space.

DESCRIPTION OF EMBODIMENTS (1) Outline

In the following, a preferred embodiment of an advertisement distribution system according to the present invention will be described. The advertisement distribution system according to the embodiment displays different-sized advertisements in a predetermined sized display space included in a Web page. The display space is, for example, an advertising space.

Figure 1:
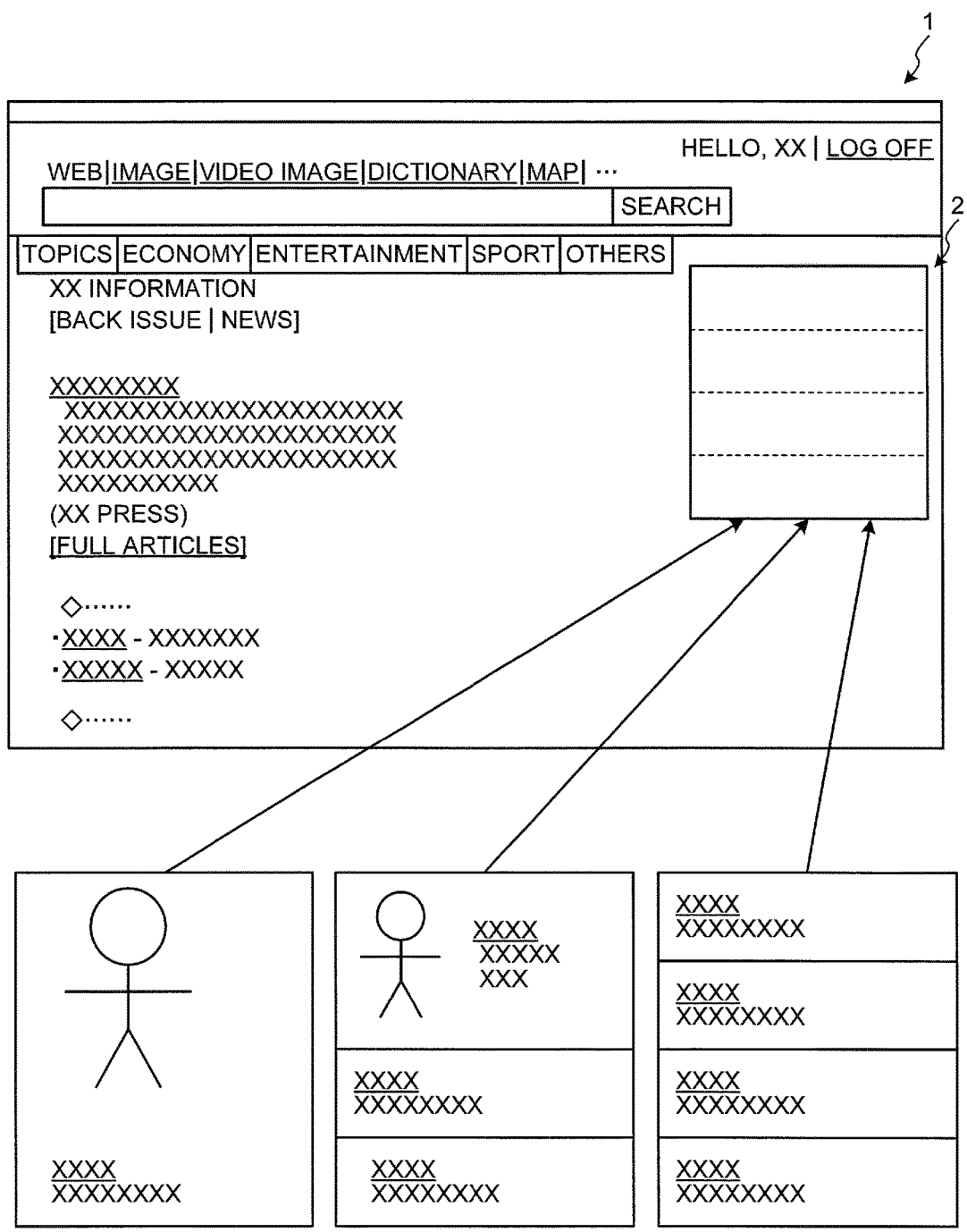
FIG. 1 is a schematic diagram illustrating an example of a Web page provided by an advertisement distribution system according to an embodiment of the present invention.

FIG. 1 is a schematic diagram illustrating an example of a Web page 1 provided by an advertisement distribution system according to the embodiment. A display space 2 is provided on the Web page 1. The width and the height of the display space 2 are fixed. For example, the ratio of the width to the height is 5 to 4, with one unit being of a predetermined length. Furthermore, it is assumed that the width of an advertisement to be displayed on the display space 2 is fixed and is the same as the width of the display space 2. It is assumed that the height of the advertisement to be displayed in the display space 2 is variable. Specifically, in the display space 2, multiple advertisements of different heights can be displayed in the vertical direction. In the example illustrated in FIG. 1, because the height of the display space 2 is 4, it is possible to display a single advertisement whose height is 4 or it is possible to display three advertisements, one with the height 2, and two with the height 1. Furthermore, it is possible to display four advertisements whose heights are each 1.

(2) System Configuration

Figure 2:
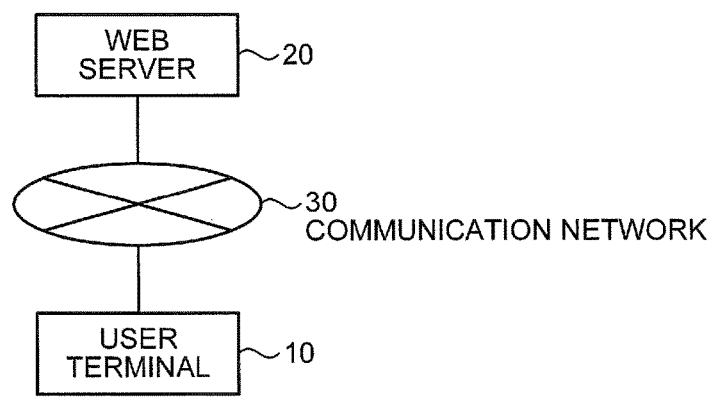
FIG. 2 is a schematic diagram illustrating the overall configuration of the advertisement distribution system according to an embodiment of the present invention.

FIG. 2 is a schematic diagram illustrating an overall configuration of the advertisement distribution system according to an embodiment of the present invention. The advertisement distribution system according to the embodiment is constituted by including a Web server 20. A user terminal 10 can access the Web server 20 via a communication network 30. The communication network 30 is, for example, the Internet, a wide area network (WAN), a local area network (LAN), a value added network (VAN), or the like, that is constructed by, for example, a public telephone network, a mobile phone network, a wireless communication network, an Ethernet (registered trademark), or the like. In the embodiment, a description will be given with the assumption that, in the communication network 30, TCP/IP is used for the communication.

The user terminal 10 is a computer, such as a mobile phone terminal, a smart phone, a tablet computer, a laptop computer, or a personal computer, that is operated by a user. A Web browser is running on the user terminal 10. The user uses the Web browser to access the Web server 20 by using a Hyper Text Transfer Protocol (HTTP). FIG. 1 illustrates only one user terminal 10; however, multiple user terminals 10 are present for each user.

The Web server 20 is a computer, such as a personal computer or a workstation, that provides content, such as a Web page, still image data, video image data, or sound data, described in, for example, the Hyper Text Markup Language (HTML) or the Extensible Markup Language (XML). The Web server 20 may also be implemented by a single computer or multiple computers. The Web server 20 embeds an advertisement in a Web page to provide the advertisement. The advertisement can be provided by using various kinds of data, such as image data, video image data, or sound data. To simplify the description below, a description will be given with the assumption that the Web server 20 embeds an image advertisement in a Web page described in HTML.

(3) Hardware

Figure 3:
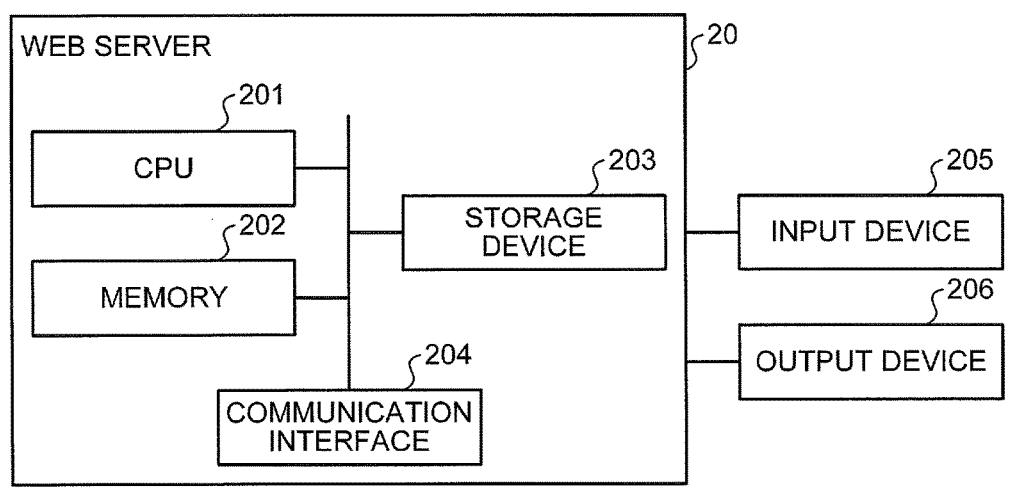
FIG. 3 is a schematic diagram illustrating an example of the hardware configuration of a Web server.

FIG. 3 is a schematic diagram illustrating an example of the hardware configuration of the Web server 20. The Web server 20 includes a CPU 201, a memory 202, a storage device 203, a communication interface 204, an input device 205, and an output device 206. The storage device 203 is, for example, a hard disk drive, a solid state drive, or a flash memory, that stores therein various kinds of data or programs. The CPU 201 reads the program stored in the storage device 203 to the memory 202 and executes the program, thereby implementing various functions. The communication interface 204 is an interface for connecting to the communication network 30 and is, for example, an adapter for connecting to an Ethernet (registered trademark), a modem for connecting to the public telephone network, a wireless communication device that connects to a wireless communication network, or the like. The input device 205 is, for example, a keyboard, a mouse, a track ball, a touch panel, a microphone, or the like, that receives an input of data. The output device 206 is, for example, a display, a printer, a speaker, or the like, that outputs data. The Web server 20 may also include multiple input devices 205 and output devices 206.

(4) Software

Figure 4:
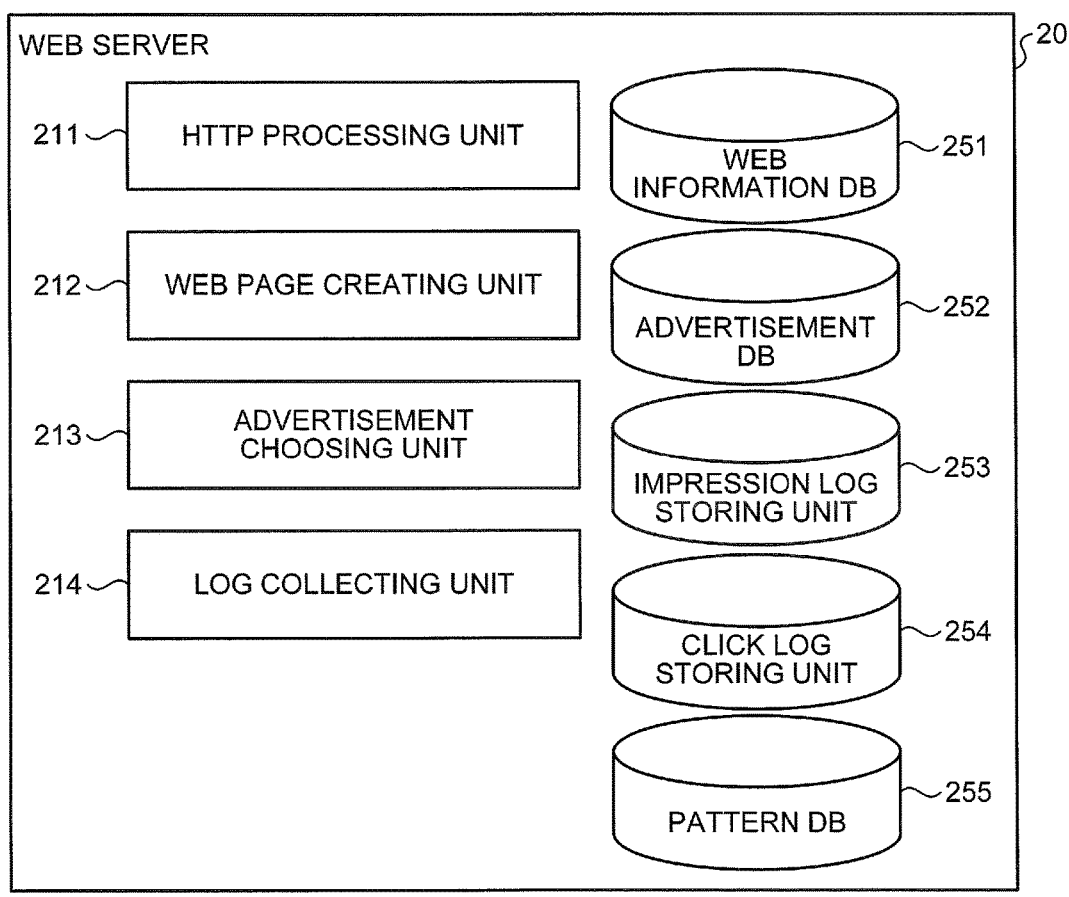
FIG. 4 is a schematic diagram illustrating an example of the software configuration of the Web server.

FIG. 4 is a schematic diagram illustrating an example of the software configuration of the Web server 20. The Web server 20 includes processing units, such as an HTTP processing unit 211, a Web page creating unit 212, an advertisement choosing unit 213, and a log collecting unit 214. Furthermore, the Web server 20 includes storing units, such as a Web information database (DB) 251, an advertisement database 252, an impression log storing unit 253, a click log storing unit 254, and a pattern database 255. These processing units are implemented by the CPU 201 included in the Web server 20 reading the program stored in the storage device 203 to the memory 202 and executing the program.

(5) Storing Unit

The Web information database 251 stores therein information that is used to create a Web page (hereinafter, referred to as Web information). The Web information is, for example, a program file or an image file in which a file described in an HTML or a program executed by a method, such as a Common Gateway Interface (CGI), is stored. The Web information database 251 can be implemented by, for example, a directory or a folder in a file system that is provided by an operating system running on the Web server 20. It is assumed that the Web information database 251 manages, in a typically used Web server, various pieces of content by using a method for managing content.

The advertisement database 252 stores therein information related to an advertisement (hereinafter, referred to as advertising information). FIG. 5 is a schematic diagram illustrating an example configuration of advertising information stored in the advertisement database 252. The advertising information includes therein an advertisement ID that is identification information on an advertisement, a Uniform Resource Locator (URL) that indicates a landing page of the advertisement, the title and description of the advertisement, the size of the advertisement (size), a bid amount, the click rate (CTR; Click Through Rate) of the advertisement, and the like.

In the embodiment, for the column of title/description in the advertising information in FIG. 5, it is assumed that the first line indicates a title and it is assumed that the second line and the subsequent lines indicate a description. In this description, for example, data, such as image data, may also be embedded by using an <IMG> tag.

If an advertisement is clicked on, a request including an advertisement ID is sent to the Web server 20; a log indicating that the advertisement has been clicked (click log) is collected by the log collecting unit 214, which will be described later; and a Web page is redirected by the HTTP processing unit 211 to a URL of advertising information that is associated with the advertisement ID (for example, a response is sent in which the target URL is specified as the redirect destination). Consequently, it is possible to detect an action (click) performed by the user that is dependent on an advertisement.

The size of an advertisement is specified by an advertiser when the advertisement is submitted. In the embodiment, as described above, the width of an advertisement is fixed; therefore, it is assumed that the size of an advertisement corresponds to the height of the advertisement.

A bid amount is a unit price paid by an advertiser when an advertisement is clicked on. The bid amount is specified by the advertiser when the advertisement is submitted.

The click rate (CTR) is obtained by dividing the number of times the advertisement is clicked in the past by the number of times the advertisement was displayed in the past (referred to as an impression count). The impression count and the click count can be obtained by counting the number of impression logs and click logs that are registered in the impression log storing unit 253 and the click log storing unit 254, respectively, which will be described later.

In the embodiment, a description will be given with the assumption that the actual click rate included in advertising information is used as the predicted click rate. However, considering a factor other than the actual click rate, the predicted click rate may also be calculated on the basis of the actual click rate.

The impression log storing unit 253 stores therein a log indicating that an advertisement was displayed, which is called an impression (hereinafter, referred to as an impression log). FIG. 6 is a schematic diagram illustrating an example configuration of an impression log stored in the impression log storing unit 253. The impression log includes therein the date and time at which an advertisement was displayed on the user terminal 10, i.e., the date and time at which the Web page 1 was delivered to the user terminal 10; a URL indicating the Web page 1; and an advertisement ID that indicates the displayed advertisement.

The number of impression logs registered is the same as the number of advertisements that were displayed in the display space 2. For example, if the Web page 1 is browsed once and the Web page 1 displays four advertisements each with a height of 1 in the display space 2, four impression logs are registered.

The click log storing unit 254 stores therein a log indicating that an advertisement displayed on the Web page 1 has been clicked on (hereinafter, referred to as a click log). FIG. 7 is a schematic diagram illustrating an example configuration of a click log stored in the click log storing unit 254. The click log includes therein an advertisement ID that indicates a clicked advertisement, a URL of the Web page 1 on which the advertisement was displayed, and the date and time at which the advertisement was clicked on (click date and time).

The pattern database 255 stores therein information for choosing the pattern of an advertisement arranged in the display space 2 (hereinafter, referred to as pattern information). In the embodiment, it is assumed that, the pattern information is information that indicates a prohibited pattern among the patterns of an advertisement that can be arranged in the display space 2. Alternatively, however, the pattern information may also be information that indicates the pattern of an advertisement that can be arranged in the display space 2.

Figure 8:
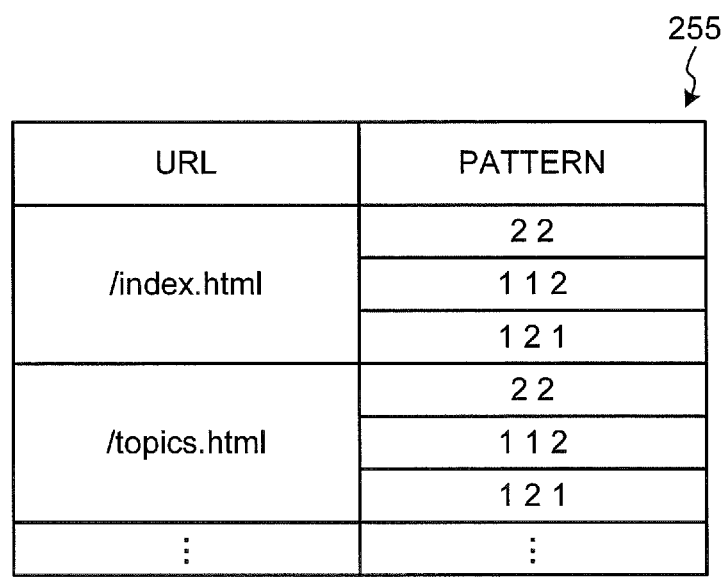
FIG. 8 is a schematic diagram illustrating an example configuration of pattern information registered in a pattern database.

FIG. 8 is a schematic diagram illustrating an example configuration of pattern information registered in the pattern database 255. The pattern information includes, for each URL indicating the Web page 1, prohibited arrangement patterns of an advertisement. As described above, in the embodiment, because the width of the display space 2 is the same as that of an advertisement, one or more advertisements are displayed from the top to the bottom in the display space 2. Here, the "pattern" included in the pattern information indicates the sizes of advertisements from the top to the bottom of the display space 2. In the example illustrated in FIG. 8, the pattern of "2 2" indicates that arrangement of two advertisements each with a height of 2 in the display space 2 is prohibited. Furthermore, the pattern of "1 1 2" indicates that the arrangement of three advertisements, two with a height of 1 and one with a height of 2 from the top to the bottom of the display space 2 is prohibited.

(6) Description of the Processing Unit

The HTTP processing unit 211 performs HTTP processing. It is assumed that the process performed by the HTTP processing unit 211 that is in accordance with the HTTP is a process performed by a typical Web server.

The HTTP processing unit 211 receives an HTTP request sent from the user terminal 10. The request includes a user ID that specifies the user of the user terminal 10. If a predetermined URL (hereinafter, referred to as a redirect URL) specified by an advertisement ID is specified in the request, the HTTP processing unit 211 reads the advertising information that is associated with the advertisement ID from the advertisement database 252 and sends, to the user terminal 10, a response indicating that the URL included in the read advertising information is specified as the redirect destination. Consequently, the user terminal 10 is redirected to a landing page. Furthermore, the HTTP processing unit 211 calls the log collecting unit 214 to register a click log and to update the click rate.

In contrast, if a URL that indicates a Web page other than the redirect URL is specified in the request, the HTTP processing unit 211 calls the Web page creating unit 212 to create a Web page. Furthermore, the HTTP processing unit 211 calls the log collecting unit 214 to register an impression log and to update the click rate. The Web page created by the Web page creating unit 212 is sent to the user terminal 10 as a response.

The Web page creating unit 212 creates the Web page 1. The Web page creating unit 212 reads the Web information stored in the Web information database 251 and creates the Web page 1 on the basis of the read Web information. The Web page creating unit 212 can create the Web page 1 by using a process performed by a typical Web server. Furthermore, the Web page creating unit 212 calls the advertisement choosing unit 213 to choose an advertisement and embeds the advertisement chosen by the advertisement choosing unit 213 in the display space 2 on the Web page 1. The Web page creating unit 212 sets, for example, a predetermined value of the width in a block element, such as a <DIV> tag; sets the size of an advertisement indicated by advertising information based on the height; and sets the title and the description of the advertising information as the content of the block element, whereby the Web page creating unit 212 embeds the advertisement in the display space 2. At this point, the Web page creating unit 212 sets, in the title, a link to the redirect URL in which an advertisement ID is set to an argument.

The advertisement choosing unit 213 chooses an advertisement to be displayed on the display space 2 in the Web page 1. The advertisement choosing unit 213 selects an advertisement such that the total height (size) of the advertisement does not exceeds the height (4 in the example illustrated in FIG. 1) of the display space 2. Furthermore, the advertisement choosing unit 213 chooses an advertisement such that the click rate increases. Further, the advertisement choosing unit 213 may choose a combination of advertisements which matches a pattern indicated by the pattern information when the pattern information indicates a pattern of advertisement(s) arrangeable in the display space. Alternatively, when the pattern information indicates a prohibited pattern, the advertisement choosing unit 213 may choose a combination of advertisements which matches a pattern other than the prohibited pattern.

In the embodiment, in accordance with the content included in the Web page 1, the advertisement choosing unit 213 selects candidates for advertisements that are displayed by using typical content matching advertising; determines, in the descending order of the click rates of the selected candidates, whether an advertisement can be displayed in the display space 2; and chooses an advertisement to be displayed on the display space 2. The advertisement chosen by the advertisement choosing unit 213 is inserted, by the Web page creating unit 212, into the display space 2 in the Web page 1. The advertisement choosing unit 213 may obtain all combinations of candidates that can be displayed on the display space 2 and select, from among the combinations, a combination for which the total click rates are the maximum.

The log collecting unit 214 registers an impression log and a click log.

If a redirect URL was specified in a request, the log collecting unit 214 creates a click log in which an advertisement ID specified in the redirect URL, a referrer (a URL that indicates a Web page on which the clicked advertisement was displayed) included in the request, and the current date and time are set. Then the log collecting unit 214 registers the created click log in the click log storing unit 254. Furthermore, the log collecting unit 214 updates the click rate of the advertising information that is associated with the advertisement ID. Specifically, the log collecting unit 214 updates the advertisement database 252 by counting the number of click logs and the number of impression logs associated with the advertisement ID from the click log storing unit 254 and the impression log storing unit 253, respectively; by calculating the click rate by dividing the number of click logs by the number of impression logs; and by setting the calculated click rate in the click rate of the advertising information associated with the advertisement ID. The log collecting unit 214 calculates the click rate when a click log is registered and then updates the advertising information. However, when the advertisement choosing unit 213 chooses an advertisement, the advertisement choosing unit 213 may also calculate the predicted click rate by referring to the impression log storing unit 253 and the click log storing unit 254.

If a URL other than the redirect URL is specified in a request, the log collecting unit 214 creates, for each advertisement chosen by the advertisement choosing unit 213, an impression log that includes therein the current date and time, the URL specified in the request, and the advertisement ID that indicates the advertisement and then registers the created impression log in the impression log storing unit 253.

(7) Request Process

Figure 9:
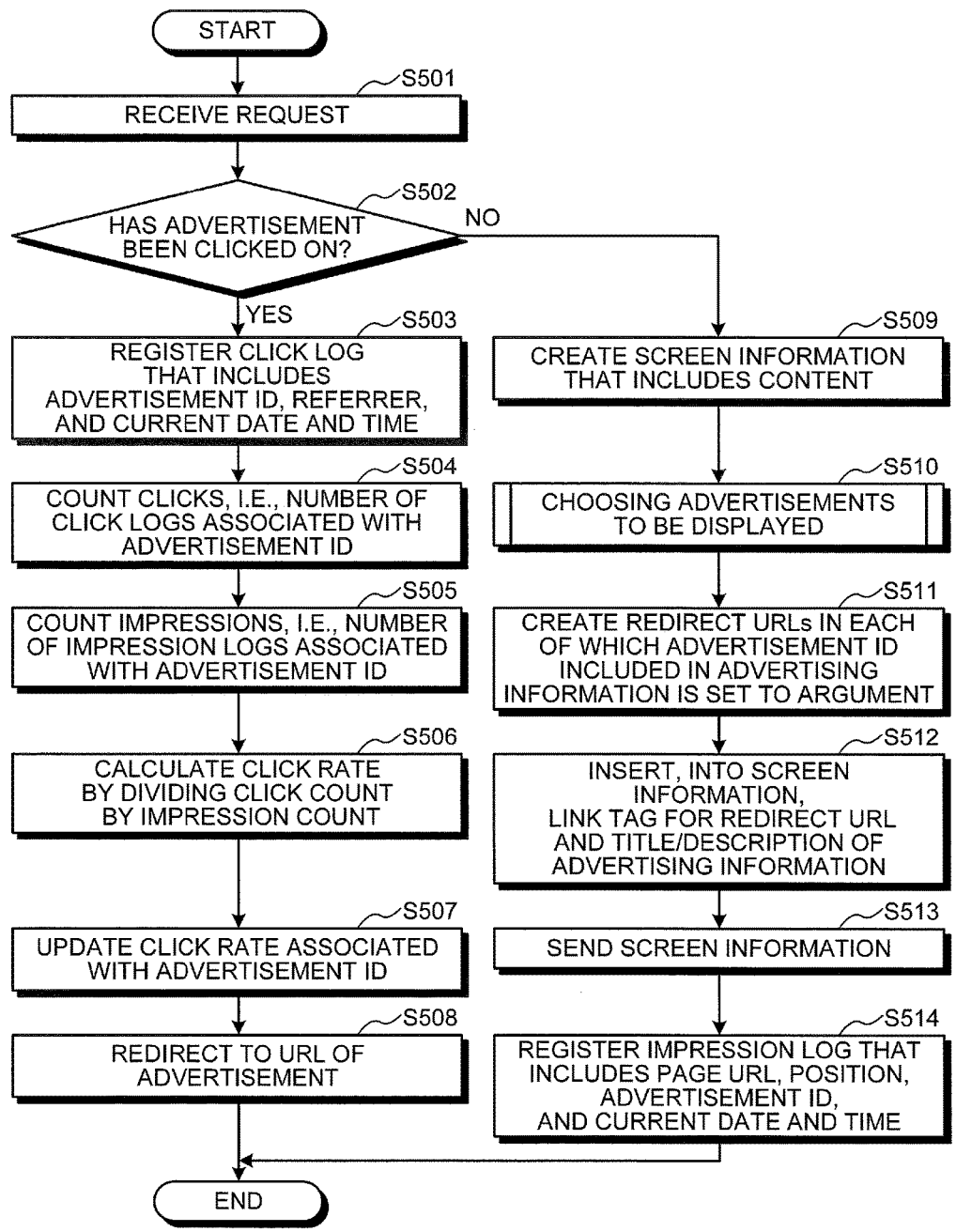
FIG. 9 is a flowchart illustrating the flow of a request process performed by a Web server.

FIG. 9 is a flowchart illustrating the flow of a request process performed by the Web server 20.

If the HTTP processing unit 211 receives an HTTP request from the user terminal 10 (Step S501), the HTTP processing unit 211 determines, on the basis whether a redirect URL is specified in the request, whether an advertisement has been clicked on (Step S502).

If it is determined that an advertisement has been clicked on (Yes at Step S502), the log collecting unit 214 reads, from the advertisement database 252, the advertising information associated with the advertisement ID that is set in the redirect URL; creates a click log that includes therein the advertisement ID that is set in the request, the URL that indicates the Web page on which the advertisement indicated by the advertisement ID was displayed, and the current date and time; and then registers the created click log in the click log storing unit 254 (Step S503). The URL that indicates the Web page on which the advertisement was displayed can be obtained by reading, for example, the referrer that is set in the request. Furthermore, for example, the Web server 20 may also establish a session for each user terminal 10, record the URL of the Web page 1 that was immediately previously displayed as the session information, and obtain the URL, which was recorded as the session information, as the URL of the displayed advertisement. Alternatively, the Web server 20 may also encode the URL of the Web page on which the advertisement was displayed, and set the encoded URL in the redirect URL.

The log collecting unit 214 counts, from the click log storing unit 254, the number of click logs associated with an advertisement ID that is set in the redirect URL (Step S504); counts the number of impression logs associated with the advertisement ID from the impression log storing unit 253 (Step S505); and then calculates the click rate by dividing the click count by the impression count (Step S506). The log collecting unit 214 updates, to the calculated click rate, the click rate of the advertising information associated with the advertisement ID in the advertisement database 252 (Step S507).

The HTTP processing unit 211 sends, to the user terminal 10, an HTTP response indicating that the Web page is to be redirected to the URL of the advertising information (Step S508).

In contrast, if it is determined that an advertisement was not clicked on (No at Step S502), the Web page creating unit 212 creates screen information, such as an HTML file, that is used to display various pieces of content in accordance with the URL that is set in the request (hereinafter, referred to as a page URL) (Step S509). A process performed by a typical Web server can be used for the process for creating the screen information performed at Step S510.

In the process illustrated in FIG. 10, which will be described later, the advertisement choosing unit 213 chooses the advertisements to be displayed in the display space 2 and then creates a list of advertising information according to the chosen advertisements (hereinafter, referred to as an advertising list) (Step S510). The Web page creating unit 212 creates redirect URLs in each of which the advertisement ID included in the advertising information is set to an argument such that the advertising information is sequentially displayed, in the display space 2 starting from the top of the advertising list (Step S511); extracts a title and a description from the advertising information; and inserts, into screen information, a tag, in which a link to the redirect URL is set in the title, and the description. For example, the format of "<a href="http://www.foobar.com/ad?id=xxxx">title</a>" may be used for the tag (Step S512).

The HTTP processing unit 211 sends, to the user terminal 10, the created screen information as a response to the request (Step S513). The log collecting unit 214 creates, for each piece of advertising information, an impression log that includes the current date and time, a page URL, and an advertisement ID and then registers the created impression log in the impression log storing unit 253 (Step S514).

(8) Advertisement Choosing Process

FIG. 10 is a flowchart illustrating the flow of a process for choosing an advertisement to be displayed on the display space 2.

The advertisement choosing unit 213 extracts a predetermined number of pieces of advertising information (m pieces) in accordance with the content that is included in the screen information created by the Web page creating unit 212 (Step S521). A typical method, such as content matching advertising or keyword targeted advertising, may be used for the process of selecting the advertising information that is performed in accordance with the content.

The advertisement choosing unit 213 reads the pattern information that is associated with the page URL from the pattern database 255 (Step S522); sets the height of the display space 2 to H ("4" in the example illustrated in FIG. 1) (Step S523); creates an empty pattern of the selected advertisement (Step S524); creates an empty advertising list in which advertising information that is used to display an advertisement on the display space 2 is stored (Step S525); and creates an empty waiting list in which advertising information that is excluded from being a primary candidate is stored (Step S526).

If H is not zero (No at Step S527) and advertising information is included in the candidate list (Yes at Step S528), the advertisement choosing unit 213 extracts the advertising information with the highest click rate from the candidate list (Step S529). The extracted advertising information is deleted from the candidate list.

If the height of the advertising information is equal to or less than H (Yes at Step S530), the advertisement choosing unit 213 defines a pattern in which a pattern P and the height of advertising information are arranged as P1 (Step S531). If a pattern that is the same as that of P1 is included in the pattern information (Yes at Step S532), the advertisement choosing unit 213 adds the advertising information to the waiting list (Step S533) and repeats the process at Step S527 and the subsequent processes.

If the same pattern as that of P1 is not included in the pattern information (No at Step S532), the advertisement choosing unit 213 subtracts the height of the advertising information from H (Step S534), adds the height of advertising information to P (Step S535), adds the advertising information to the advertising list (Step S536), extracts all the pieces of advertising information from the waiting list, and adds the extracted advertising information to the candidate list (Step S537). All the pieces of advertising information are deleted from the waiting list. The advertisement choosing unit 213 repeats the process at Step S527 and the subsequent processes.

In this way, an advertisement to be displayed in the display space 2 is chosen and pieces of advertising information are sequentially registered from the top in the advertising list in the order the pieces of advertising information are arranged in the display space 2.

(9) Advantages

With the advertisement distribution system according to the embodiment, it is possible to choose, from among advertisements depending on content, an advertisement that is to be displayed in the display space 2 such that the height of the advertisement does not exceed the height of the display space 2. Consequently, advertisements with various sizes can be presented in the display space 2.

Furthermore, with the advertisement distribution system according to the embodiment, because advertisements can be selected in the descending order of the click rate, the click rate in the display space 2 can be improved. Furthermore, an advertisement with a high click rate can be selected without comparing all combinations. Consequently, the click rates of advertisements in the display space 2 can be efficiently improved.

Furthermore, with the advertisement distribution system according to the embodiment, advertisements are not arranged in a prohibited pattern. Specifically, from among arrangement patterns in which advertisements of different sizes are arranged, patterns that are prohibited are registered as pattern information in accordance with the design needs. Consequently, the layout can be easily restricted.

(10) Modification 1: Shape

In the embodiment, the description thus far has been given with the assumption that an advertisement is rectangular shaped; however, the embodiment it not limited thereto and the advertisement may be of any shape. For example, any shape, such as an angular-U shape, a dogleg shape, or an L shape, may also be used. In such a case, the advertisement choosing unit 213 sequentially arranges advertisements of higher CTR from the top of the display space 2, and then selects an advertisement that can be fitted in a portion remaining empty after the advertisements of higher CTR have been arranged in the display space 2. Consequently, even if advertisements in various shapes are demanded in terms of the design, the advertisement distribution system can cope with such needs.

(11) Modification 2: Correlation

An advertisement may also be selected such that, by taking into consideration the correlation of the click rates of advertisements that are simultaneously displayed, all of the click rates of the advertisements to be displayed in the display space 2 becomes the maximum. In such a case, the advertisement choosing unit 213 calculates the correlation rate $q_{ab}$ by using Equations (E1) to (E4) below, where, for example, U is the total number of users, $u_a$ is the number of users who clicked on an advertisement a in the past, $p_a$ is the click rate of the advertisement a, $u_b$ is the number of users who clicked on an advertisement b in the past, and $p_b$ is the click rate of the advertisement b. Then, an advertisement is chosen such that a value obtained by subtracting the sum of the correlation rates q of pairs of advertisements from the sum of the click rates becomes the maximum. Consequently, it is possible to enhance the possibility of clicks of the advertisements in the entirety of the display space 2.

$$p_a = \frac{u_a}{U} \quad (E1)$$

$$p_b = \frac{u_b}{U} \quad (E2)$$

$$Q_{ab} = \frac{\frac{u_{ab}}{U}}{p_a \times p_b} \quad (E3)$$

$$q_{ab} = \min(p_a \times p_b \times Q_{ab}, p_a, p_b) \quad (E4)$$

Equation (E4) corresponds to a calculating process of adjusting $q_{ab}$ such that $q_{ab}$ does not exceed the click rates $p_a$ and $p_b$. Furthermore, $u_a$, i.e., the number of users who clicked on the advertisement a in the past, is obtained by, for example, including a user ID in a click log in advance and by counting the number of user IDs that are not overlapped with each other and that are associated with the advertisement a in the click log storing unit 254.

Furthermore, when the correlation rate is taken into consideration as described above, the advertisement choosing unit 213 may also perform a process at Step S529 in the advertisement choosing process illustrated in FIG. 10 as follows. Namely, for example, for each piece of advertising information included in the candidate list, the advertisement choosing unit 213 calculates the correlation rates of an advertisement that is related to the advertising information included in the candidate list and an advertisement that is related to advertising information included in the advertising list; calculates, as a modified CTR, a value by subtracting the sum of the correlation rates from the sum of the click rate of the advertising information; and extracts, from the candidate list, advertising information with the highest modified CTR.

(12) Modification 3: Bias

There may be a case in which, even in the same display space 2 or even in the same advertisement, for example, the click rate of the advertisement that is arranged in an upper portion is high or the click rate of the advertisement that is arranged in the middle portion is high. In such a case, for example, the area the same advertisement is displayed in the display space 2 is changed and a change in the click rate is measured, whereby it is possible to measure the tendency for the advertisement to be frequently clicked on depending on its arranged position in the display space 2 (called a bias). The advertisement choosing unit 213 may also choose an advertisement by taking into consideration this bias.

It is assumed that a bias storing unit is provided for storing therein a bias for each display position, by dividing the display space 2 into units of a predetermined length and using each area with the unit length as the display position. In the example illustrated in FIG. 1, the display space 2 is divided into four. In FIG. 1, for example, it is possible to sequentially store the biases corresponding to display positions from the top to the bottom by associating "1.0" with a first display position, "0.8" with a second display position, "0.7" with a third display position, and "0.6" with a fourth display position. In such a case, instead of performing the processes illustrated in FIG. 10, the advertisement choosing unit 213 obtains all of the combinations of pieces of advertising information that can be arranged in the display space 2; excludes a combination whose pattern of the heights of advertisements is included in the pattern information; sums, for each combination, the product of a bias associated with a display position and the click rate of the advertising information; and chooses the combination with the highest total value as an advertising list. For the advertisement whose height is greater than 1, an average value of biases of the display positions in which the advertisement is arranged may be multiplied by the click rate.

As described above, an advertisement to be distributed is chosen by taking into consideration the tendency for an advertisement to be frequently clicked on due to its display position in the display space 2. Consequently, it is possible to enhance the click rate to the maximum in the entirety of the display space 2.

(13) Modification 4: Video Image

A video image or a combination of a character string and a video image or sound may also be used for advertisements. In such a case, the length of the video image or the sound (playback time) can be considered. Here, the maximum playback time of the video image is set for the display space 2. An example of the maximum playback time of the video image includes an average time a user spends on the Web Page 1. Furthermore, the playback time of the video image or the sound may be included in advertising information. In the processes illustrated in FIG. 10, the advertisement choosing unit 213 can extract, from the candidate list, only the advertising information whose playback time does not exceed the playback time that is set for the display space 2. Consequently, it is possible to display a video image whose playback time is in line with the playback time that is set for the display space 2.

Furthermore, in such a case, the advertisement choosing unit 213 may select one piece of advertisement information whose playback time is within the maximum playback time set for the display space 2, and further select another piece of advertising information whose playback time is within the difference between the maximum playback time and the playback time of the selected one piece of advertising information. Thus, the advertisement choosing unit 213 may choose a series of multiple advertisements as a single advertisement and store in the advertising list so that the advertisement can be switched from one to another after the playback of a video image or sound of one advertisement is finished. If an advertisement included in the advertising list is constructed by a series of multiple advertisements, the Web page creating unit 212 may store a program language, such as Java Script (registered trademark), in the Web page 1 so that the playback of the subsequent advertisement starts when the playback of the video image or sound of one advertisement is finished in the display space 2.

(14) Another Modification

In the embodiment, it is assumed that the width of an advertisement displayed in the display space 2 is fixed and only the height varies; however, the embodiment is not limiting and the width may also vary.

Furthermore, in the embodiment, an advertisement is chosen such that the click rate becomes high; however, the embodiment is not limiting. For example, an advertisement may be chosen such that eCPM (effective Cost Per Mill), which is the product of the click rate and a bid amount, becomes high. For example, at Step S529 illustrated in FIG. 10, advertising information with the highest eCPM can be extracted.

Furthermore, in the embodiment, in the processes illustrated in FIG. 10, the advertisement choosing unit 213 sequentially chooses advertisements, one at a time starting from the one with the highest click rate; however, the present invention is not limited thereto. For example, all combinations of advertisements with the size arrangeable in the display space 2 are extracted from the advertisements in the candidate list while the order of the advertisements is considered. Then, patterns that are included in the pattern information and that indicate the order of sizes of advertisements included in the combinations are excluded. The total value of the click rates of the advertisements in each combination is calculated and then the combination whose total value of the click rate is the highest is used as the advertising list. Consequently, it is possible to choose an advertisement that is to be displayed in the display space 2 such that the click rate becomes maximum.

Furthermore, in the embodiment, the description thus far has been given with the assumption that the Web server 20 distributes an advertisement. However, an advertisement distribution server may also be separately arranged from the Web server 20 and an advertisement may be distributed from the advertisement distribution server. In such a case, the Web page creating unit 212 in the Web server 20 includes, in the Web page 1, a tag of a display space 2 in which only a link to the advertisement distribution server is included; a request is sent from the user terminal 10 to the advertisement distribution server in accordance with the link; and the advertisement distribution server can send an advertisement, i.e., the title and the description in which a link to a redirect URL is set.

According to an aspect of the embodiments, it is possible to select an advertisement such that advertisements of various sizes can be displayed in a display space of a predetermined size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement choosing device that chooses an advertisement to be displayed in a display space of a predetermined size in a display screen of a user terminal, the advertisement choosing device comprising:
   a memory storing: (i) an advertisement database including sizes of a plurality of advertisements, (ii) a click log database including a click log, and (iii) a pattern database including pattern information of each of a plurality of webpages, the pattern information indicating one or more arrangement pattern of advertisements to be arranged within a single advertisement space on the webpage; and
   a processor operatively coupled to the memory, the processor being programmed to:
      receive a request from the user terminal for the webpage;
      store, when the request includes a predetermined redirect URL (Uniform Resource Locator) corresponding to an advertisement, click information in the click log corresponding to the advertisement, the click log indicating a click through rate of each of the plurality of advertisements;
      assign an evaluation value to each of the plurality of advertisements based on at least the click log database such that a higher evaluation value is assigned to advertisements with a higher click through rate, and rank each of the plurality of advertisements based on the click through rate of each of the plurality of advertisements;
      refer, when the request includes a predetermined URL other than the predetermined redirect URL, to the pattern information stored in association with the predetermined URL in the memory;
      calculate a correlation of the click through rate of the plurality of advertisements, which is a minimum value of at least one of the following: (i) one ratio of the number of users who clicked each of the plurality of advertisements to a total number of users, and (ii) a product of each of the ratios multiplied by each other and multiplied by a value obtained by dividing a ratio of a number of users who clicked on at least two of the plurality of advertisements to a total number of users by the product of each of the ratios multiplied by each other;
      select, from the plurality of advertisements, a predetermined number of advertisements as indicated by the pattern information of the predetermined URL based on: (i) a highest corrected click through rate of each of the plurality of advertisements that is corrected by subtracting the calculated correlation of each of the plurality of advertisements from the corresponding click through rate of each of the plurality of advertisements, (ii) a size of each of the predetermined number of advertisements being equal to or less than the predetermined size indicated by the pattern information and a total size of the predetermined number of advertisements being equal to or less than the predetermined size of the display space, and (iii) a highest evaluation value of the at least one advertisement based on the ranking of the plurality of advertisements, the size of each of the plurality of advertisements being indicated by the advertisement database, whereby the predetermined number of advertisements are selected to match the pattern of the pattern information to be displayed in the single advertisement space such that the advertisements maximize a total value of the evaluations of each of the predetermined number of advertisements; and
      transmit the selected predetermined number of advertisements for display in the single advertisement space in the webpage on the display screen of the user terminal.

2. The advertisement choosing device according to claim 1, wherein:
   the processor is programmed to select a combination of the at least one advertisement to be displayed in the display space, the selected combination matching a pattern indicated by the stored pattern information.

3. The advertisement choosing device according to claim 1, wherein:
   the memory stores pattern information indicating a prohibited pattern of advertisement arrangement; and
   the processor is programmed to select a combination of the at least one advertisement to be displayed in the display space, the selected combination matching a pattern different from the prohibited pattern indicated by the stored pattern information.

4. The advertisement choosing device according to claim 1, wherein:
   the memory stores a shape of each of the plurality of advertisements; and
   the processor is programmed to select the at least one advertisement to be displayed in the display space, the selected at least one advertisement being arrangeable within the display space without overlapping with each other.

5. The advertisement choosing device according to claim 1, wherein the processor is programmed to:
   sequentially select each of the plurality of advertisements, one at a time, in a descending order of the evaluation value having a size that is equal to or less than the size of the display space.

6. The advertisement choosing device according to claim 1, wherein the processor is programmed to:
   select a combination of the at least one advertisement to be displayed in the display space, a sum of evaluation values of advertisements included in the selected combination being greatest.

7. The advertisement choosing device according to claim 6, wherein:
   the memory stores the calculated correlation between two of the plurality of advertisements; and
   the processor is programmed to select a combination of the at least one advertisement to be displayed in the display space by selecting a highest value calculated by subtracting a sum of the calculated correlation between each of the two of the plurality of advertisements included in the selected combination from the sum of the evaluation values of advertisements included in the selected combination.

8. The advertisement choosing device according to claim 6, wherein:

the memory stores a weight corresponding to a position within the display space; and the processor is programmed to select a combination of the at least one advertisement to be displayed in the display space, a sum of a product of the evaluation value and the weight of each of advertisements in the selected combination being greatest.

9. An advertisement choosing device that chooses an advertisement of a video image displayed in a display space, the advertisement choosing device comprising:

a memory storing: (i) an advertisement database including a playback time of a plurality of advertisements, (ii) a click log database including a click log, (iii) a maximum value of a playback time of the video image to be displayed in the display space, and (iv) a pattern database including pattern information indicating one or more arrangement pattern of video images to be arranged within a single advertisement space on the webpage; and a processor operatively coupled to the memory, the processor being programmed to:

receive a request from a user terminal for the webpage;

store, when the request includes a predetermined redirect URL (Uniform Resource Locator) corresponding to an advertisement, click information in the click log corresponding to the advertisement, the click log indicating a click through rate of each of the plurality of advertisements;

assign an evaluation value to each of the plurality of advertisements based on at least the click log database such that a higher evaluation value is assigned to advertisements with a higher click through rate, and rank each of the plurality of advertisements based on the click through rate of each of the plurality of advertisements;

refer, when the request includes a predetermined URL other than the predetermined redirect URL, to the pattern information stored in association with the predetermined URL in the memory;

calculate a correlation of the click through rate of the plurality of advertisements, which is a minimum value of at least one of the following: (i) one ratio of the number of users who clicked each of the plurality of advertisements to a total number of users, and (ii) a product of each of the ratios multiplied by each other and multiplied by a value obtained by dividing a ratio of a number of users who clicked on at least two of the plurality of advertisements to a total number of users by the product of each of the ratios multiplied by each other;

select a predetermined number of advertisements to be displayed in the single advertisement space as indicated by the pattern information of the predetermined URL based on: (i) a highest corrected click through rate of each of the plurality of advertisements that is corrected by subtracting the calculated correlation of each of the plurality of advertisements from the corresponding click through rate of each of the plurality of advertisements, (ii) a total playback time of a combined playback time of each of the predetermined number of advertisements being equal to or less than the stored maximum value of the playback time of the video image, and (iii) a highest evaluation value of the at least one advertisement based on the ranking of the plurality of advertisements, whereby the total playback time of the selected predetermined number of advertisements does not exceed the stored maximum value of the playback time of the video image, such that the advertisements maximize a total value of the evaluations of each of the predetermined number of advertisements; and transmit the selected predetermined number of advertisements for display in the single advertisement space.

10. An advertisement choosing method executed by a computer for choosing an advertisement to be displayed in a display space of a predetermined size in a display screen of a user terminal, the advertisement choosing method comprising:

storing, in a memory of the computer, (i) a size of each of a plurality of advertisements, (ii) a click log, and (iii) pattern information of each of a plurality of webpages, the pattern information indicating one or more arrangement pattern of advertisements to be arranged within a single advertisement space on the webpage;

receiving a request from the user terminal for the webpage;

storing, by the computer, when the request includes a predetermined redirect URL (Uniform Resource Locator) corresponding to an advertisement, click information in a click log database corresponding to the advertisement, the click log indicating a click through rate of each of the plurality of advertisements;

assigning, by the computer, an evaluation value to each of the plurality of advertisements based on at least the click log database such that a higher evaluation value is assigned to advertisements with a higher click through rate, and ranking each of the plurality of advertisements based on the click through rate of each of the plurality of advertisements;

referring, by the computer, when the request includes a predetermined URL other than the predetermined redirect URL, to the pattern information stored in association with the predetermined URL in the memory;

calculating, by the computer, a correlation of the click through rate of the plurality of advertisements, which is a minimum value of at least one of the following: (i) one ratio of the number of users who clicked each of the plurality of advertisements to a total number of users, and (ii) a product of each of the ratios multiplied by each other and multiplied by a value obtained by dividing a ratio of a number of users who clicked on at least two of the plurality of advertisements to a total number of users by the product of each of the ratios multiplied by each other;

selecting, by the computer, from the plurality of advertisements, a predetermined number of advertisements as indicated by the pattern information of the predetermined URL based on: (i) a highest corrected click through rate of each of the plurality of advertisements that is corrected by subtracting the calculated correlation of each of the plurality of advertisements from the corresponding click through rate of each of the plurality of advertisements, (ii) a size of each of the predetermined number of advertisements being equal to or less than the predetermined size indicated by the pattern information and a total size of the predetermined number of advertisements being equal to or less than the predetermined size of the display space, and (iii) a highest evaluation value of the at least one advertisement based on the ranking of the plurality of advertisements, whereby the predetermined number of advertisements are selected to match the pattern of the pattern information to be displayed in the single advertisement space such that the advertisements maximize a total value of the evaluations of each of the predetermined number of advertisements; and transmitting the selected predetermined number of advertisements for display in the single advertisement space in the webpage on the display screen of the user terminal.

11. A non-transitory computer-readable recording medium having stored therein a program for choosing an advertisement to be displayed in a display space of a predetermined size in a display screen of a user terminal, the program causing a computer to execute a process comprising:

storing: (i) a size of each of a plurality of advertisements, (ii) a click log, and (iii) pattern information of each of a plurality of webpages, the pattern information indicating one or more arrangement pattern of advertisements to be arranged within a single advertisement space on the webpage;

receiving a request from the user terminal for the webpage;

storing, in a memory, when the request includes a predetermined redirect URL (Uniform Resource Locator) corresponding to an advertisement, click information in a click log database corresponding to the advertisement, the click log indicating a click through rate of each of the plurality of advertisements;

assigning an evaluation value to each of the plurality of advertisements based on at least the click log database such that a higher evaluation value is assigned to advertisements with a higher click through rate, and ranking each of the plurality of advertisements based on the click through rate of each of the plurality of advertisements;

referring, when the request includes a predetermined URL other than the predetermined redirect URL, to the pattern information stored in association with the predetermined URL in the memory;

calculating a correlation of the click through rate of the plurality of advertisements, which is a minimum value of at least one of the following: (i) one ratio of the number of users who clicked each of the plurality of advertisements to a total number of users, and (ii) a product of each of the ratios multiplied by each other and multiplied by a value obtained by dividing a ratio of a number of users who clicked on at least two of the plurality of advertisements to a total number of users by the product of each of the ratios multiplied by each other;

selecting, from the plurality of advertisements, a predetermined number of advertisements as indicated by the pattern information of the predetermined URL based on: (i) a highest corrected click through rate of each of the plurality of advertisements that is corrected by subtracting the calculated correlation of each of the plurality of advertisements from the corresponding click through rate of each of the plurality of advertisements, (ii) a size of each of the predetermined number of advertisements being equal to or less than the predetermined size indicated by the pattern information and a total size of the predetermined number of advertisements being equal to or less than the predetermined size of the display space, and (iii) a highest evaluation value of the at least one advertisement based on the ranking of the plurality of advertisements, whereby the predetermined number of advertisements are selected to match the pattern of the pattern information to be displayed in the single advertisement space such that the advertisements maximize a total value of the evaluations of each of the predetermined number of advertisements; and transmitting the selected predetermined number of advertisements for display in the single advertisement space in the webpage on the display screen of the user terminal.

\* \* \* \* \*